United States Patent [19]
Lin et al.

[11] Patent Number: 5,912,711
[45] Date of Patent: Jun. 15, 1999

[54] APPARATUS FOR CONVERTING AND SCALING NON-INTERLACED VGA SIGNAL TO INTERLACED TV SIGNAL

[75] Inventors: Lie-Der Lin; Ju-Hao Lee, both of Taipei; Ching-Hung Ho, Keelung; Wen-Chin Cheng, Miaoli, all of Taiwan

[73] Assignee: Umax Data Systems, Inc., Asinchu, Taiwan

[21] Appl. No.: 08/853,689

[22] Filed: May 9, 1997

[51] Int. Cl.[6] ............................................. H04N 7/01
[52] U.S. Cl. .................................... 348/446; 348/441
[58] Field of Search .................... 348/446, 581, 348/445, 441

[56] References Cited

U.S. PATENT DOCUMENTS

| | | | |
|---|---|---|---|
| 4,386,367 | 5/1983 | Peterson et al. | 358/140 |
| 4,924,315 | 5/1990 | Yamashita | 358/160 |
| 5,455,628 | 10/1995 | Bishop | 348/446 |
| 5,781,241 | 11/1996 | Donvan | 348/441 |
| 5,815,208 | 12/1994 | Samela et al. | 348/446 |

*Primary Examiner*—Andrew I. Faile
*Assistant Examiner*—Alexander Berhe
*Attorney, Agent, or Firm*—W. Wayne Liauh

[57] ABSTRACT

An apparatus for converting and scaling non-interlaced VGA signal to interlaced TV signal suitable to be displayed on a TV video screen is disclosed. The apparatus includes an analog to digital converter, a vertical scaling down device, a vertical scaling up device, a horizontal scaling down device, a horizontal scaling up device, a memory unit, a memory controller, and a digital to analog converter. The apparatus is capable of scaling the non-interlaced VGA signal to interlaced TV signal with any desired scaling size both in horizontal direction and in vertical direction to meet the requirement of displaying operation of the TV screen.

3 Claims, 11 Drawing Sheets

FIG. 3

| SCAN LINES OF VGA DASPLAY | K | |
|---|---|---|
| L0 | 3 | |
| L1 | 3+3=6 | |
| L2 | 6+3=9 | |
| L3 | 9+3=12 | NEED TO BE DISCARED |
| L4 | 12−10+3=5 | |
| L5 | 5+3=8 | |
| L6 | 8+3=11 | NEED TO BE DISCARED |
| L7 | 11−10+3=4 | |
| L8 | 4+3=7 | |
| L9 | 7+3=10 | NEED TO BE DISCARED |

FIG. 4

| SCAN LINES OF VGA DISPLAY | SCAN LINE DATA STORED IN MEMORY |
|---|---|
| L0 | MEM0 |
| L1 | MEM1 |
| L2 | MEM2 |
| L3 | |
| L4 | MEM3 |
| L5 | MEM4 |
| L6 | |
| L7 | MEM5 |
| L8 | MEM6 |
| L9 | |

FIG. 5

| SCAN LINE DATA STORED IN MEMORY | OUTPUT SCAN LINES |
|---|---|
| MEM0 | MEM0 (EVEN FIELD) |
| MEM1 | MEM1 (ODD FIELD) |
| MEM2 | MEM2 (EVEN FIELD) |
| MEM3 | MEM3 (ODD FIELD) |
|  | MEM3 (EVEN FIELD) |
| MEM4 | MEM4 (ODD FIELD) |
| MEM5 | MEM5 (EVEN FIELD) |
| MEM6 | MEM6 (ODD FIELD) |
|  | MEM6 (EVEN FIELD) |
| MEM7 | MEM7 (ODD FIELD) |
| MEM8 | MEM8 (EVEN FIELD) |
| MEM9 | MEM9 (ODD FIELD) |
|  | MEM9 (EVEN FIELD) |

APPARATUS FOR CONVERTING AND SCALING NON-INTERLACED VGA SIGNAL TO INTERLACED TV SIGNAL

BACKGROUND OF THE INVENTION

1. Field of the Invention

The present invention relates to an apparatus for converting VGA signal to TV signal, and more particularly to a converting device for converting non-interlaced VGA signal to interlaced TV signal with scaling control.

2. Description of the Prior Art

The Video Graphics Adapter (abbreviated VGA) is a standard high-quality video adapter for known personal computers. Typically, the commercial VGA display provides a screen display resolution of such as 640 by 480 pixels. More recent VGA provides even higher display resolution of 1024 by 768 pixels in a mode known as Super VGA. Television (abbreviated TV) is a standard video receiving equipment widely used in family.

For displaying visual images on a video screen, either a non-interlaced or an interlaced scanning process with predetermined pattern of scan lines is used. Most VGA displays use non-interlaced scanning technique, while most commercial TV displays use interlaced scanning method. So, it is need to convert the VGA signal of the VGA display to TV signal first in case of intending to display the VGA signal on the TV video screen. In addition, the displaying resolution difference existing between the VGA display and the TV display is need to be considered.

Figure 1:
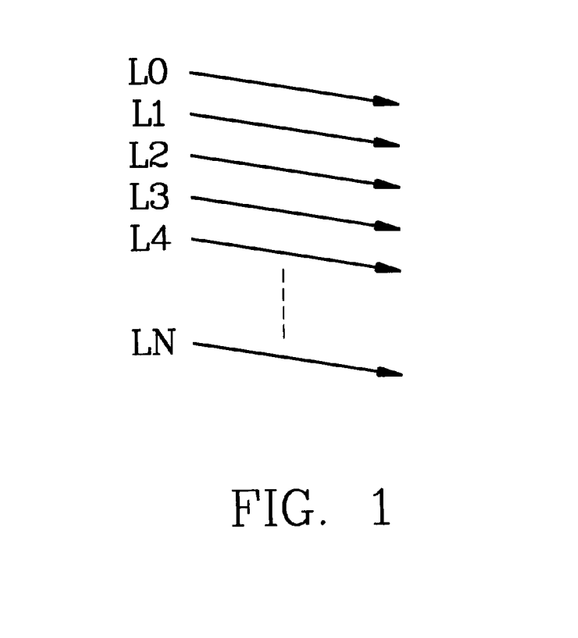
FIG. 1 schematically shows how non-interlaced data is displayed on a display.

The known Non-interlaced scanning process draws the entire picture every scan. That is, the scan lines sweep across the entire display surface to generate elements of a display image. FIG. 1 schematically shows how non-interlaced data is displayed on a video screen. The scan lines L0–LN are sequentially presented on the screen rapidly from left to right and relatively slowly from top to bottom. In such a displaying manner, a field constitutes a complete image frame.

Figure 2:
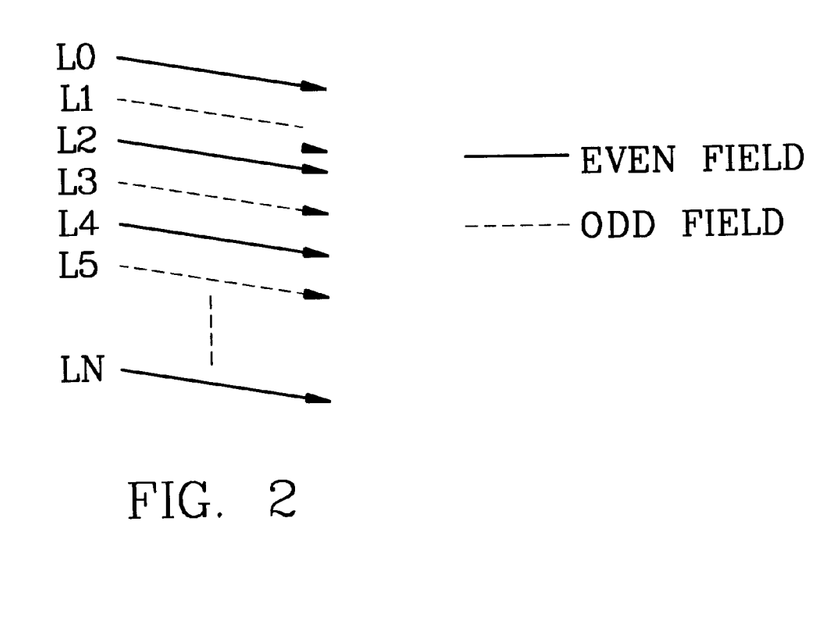
FIG. 2 schematically shows how interlaced data is displayed on a display.

FIG. 2 schematically shows how interlaced data is displayed on a display. The scan lines L0–LN are displayed on the display in an interlaced displaying manner. The interlaced displays require two scanning processes to complete each video picture. The first scan process draws the odd-numbered lines, and the second scan process draws the even-numbered lines. For example, as shown in FIG. 2, all the video data for the even numbered lines, designed by L0, L2, L4, contained in the even field is displayed first, followed by all the data for the odd-numbered lines, designed by L1, L3, L5, contained in the odd field. The even field and the odd field of the video data constitute a complete video frame. This displaying technique is known as interlaced scanning which is used in most commercial television.

From the description above, it is obvious that the scanning sequence is different between the non-interlaced scanning and interlaced scanning. The interlaced video data should be processed, stored, and converted before displaying on the TV display.

Besides, the display resolution difference between the VGA display and the TV display should be carefully processed when converting the VGA signal to TV signal suitable to be displayed on TV display. For example, the commercial VGA display available in the market provides a screen display resolution of 640 by 480 pixels or 800 by 600 pixels. The computer system operated in text mode of known DOS system provides displaying resolution of 640 pixels by 400 scan lines. On the contrary, the screen resolution of commercial televisions is fixed. For example, the display resolution in NTSC television system is 640 pixels by 448 scan lines. So, it is need to perform an enlarged or reduced process to obtain a desired TV signal suitable to be displayed on TV screen when converting the VGA signal to TV signal.

The prior art scaling method is performed based on discarding or repeating one scan line from N scan lines to achieve the enlarged or reduced purpose during scaling in vertical direction.

An example of prior art converting device for scaling interlaced video data is disclosed in U.S. Pat. No. 5,025,315, issued to Arun and Mark. The method considers each line of input data in each field sequentially, and determines whether the line is to be saved and whether the data lines in each successive field will be save, discarded, or duplicated. The prior art U.S. patent also discloses an apparatus for implementing the method for two header fields and a scaling factor. However, the prior art U.S. patent did not disclose how to convert non-interlaced video data into interlaced video data. The prior art also did not disclose how to scale the interlaced video data to a desired non-interlaced video data suitable to be displayed on TV video screen.

SUMMARY OF THE INVENTION

Consequently, it is the primary object of the present invention to provide a video data converting device capable of converting the non-interlaced VGA signal of a VGA display into interlaced TV signal suitable to be displayed on a TV display.

The other object of the present invention is to provide a converting device for converting VGA signal to TV signal with scaling control function.

The other object of the present invention is to provide a converting device allowing the video data to be scaled to any desired size both in horizontal direction and in vertical direction. The converting device of the present invention is capable of scaling the VGA signal to any desired size, either larger or smaller than the original VGA image, to meet the requirement of displaying resolution of the TV screen.

The other object of the present invention is to provide a VGA to TV video data converting device with practical scaling control function. During scaling control, the converting process is performed based on discarding or repeating M scan lines from N scan lines, instead of discarding or repeating one scan line from N scan lines of the prior art.

In order that the present invention may more readily be understood, the following description is given, merely be way of example, reference being made to the accompanying drawings, wherein:

DETAIL DESCRIPTION OF THE PREFERRED EMBODIMENT

Figure 3:
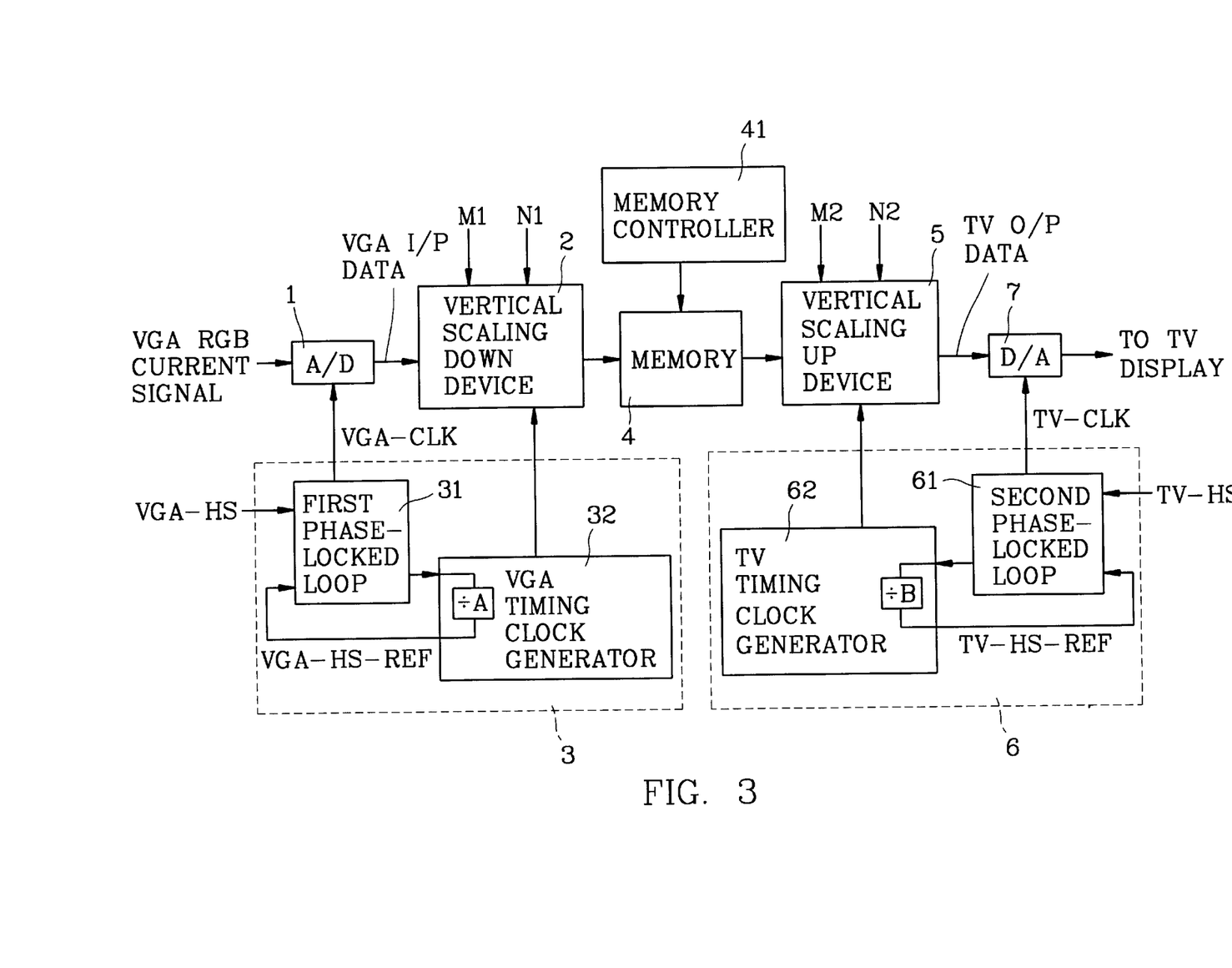
FIG. 3 is a functional block diagram in accordance with the present invention.

With reference to FIG. 3, it shows a functional block diagram in accordance with the present invention. The converting device of the present invention includes an A/D converter 1, a vertical scaling down device 2, a horizontal scaling down device 3, a memory unit 4, a memory controller 41, a vertical scaling up device 5, a horizontal scaling up device 6, and a D/A converter 7. The vertical scaling down device 2 and the horizontal scaling down device 3 in combination constitute a scaling down control device for the converting device. The vertical scaling up device 5 and the horizontal scaling up device 6 in combination constitute a scaling up control device for the converting device.

The horizontal scaling down device 3 further includes a first phase-locked loop 31 and a VGA timing clock generator 32. The vertical scaling up device 6 further includes a second phase-locked loop 61 and a TV timing clock generator 62.

The A/D converter 1 is capable of converting the analog RGB current signal from the VGA display (not shown) to digital VGA input video data which is designed by VGA I/P DATA. The VGA input video data will be sent and stored in the memory unit 4 via scaling control of the vertical scaling down device 2. Under control of the vertical scaling down device 2 and the memory controller 41, only selected VGA horizontal scan lines sent from the A/D converter 1 will be transmitted to the memory unit 4, while the other scan lines will be discarded, so that the video data from the VGA display can be scaled to any desired size in vertical direction.

The memorized video data stored in the memory unit 4 can be further transmitted to the D/A converter 7 under control of the vertical scaling up device 5. The vertical scaling up device 5 is capable of scale up the video data by repeating specific memorized VGA video data lines stored in memory unit 4 to scale up the video data in vertical direction. The enlarged video data serves as the output data designed by TV O/P DATA of the vertical scaling up device 5. The resulting video data from the D/A converter 7 will be sent to the TV display.

Under control of the vertical scaling down device 2 and the vertical scaling up device 5, it is possible to either scale up or scale down the VGA image data from the VGA display in vertical direction.

To scale down the scan lines of the VGA image data of the VGA display in horizontal direction, it is achieved by adjusting the pulse width of the VGA clock signal VGA-CLK generated by the first phase-locked loop 31 of the horizontal scaling down device 3. Similarly, to scale up the scan lines of the VGA image data of the VGA display in horizontal direction, it is achieved by adjusting the pulse width of the TV clock signal TV-CLK generated by the second phase-locked loop 61 of the horizontal scaling up device 6.

Because the VGA input video data and the TV output image data are asynchronous, it is necessary to include a synchronous control during performing the horizontal scaling adjustment. In this invention, the synchronous control is achieved by the timing control of the horizontal scaling down device 3 and the horizontal scaling up device 6, which will be described below.

As described above, the horizontal scaling down device 3 includes a first phase-locked loop 31 and a VGA timing clock generator 32. The VGA timing clock generator 32 can supply a VGA horizontal reference signal VGA-HS-REF to the first phase-locked loop 31. The first phase-locked loop 31 can receive the VGA horizontal reference signal VGA-HS-REF from the VGA timing clock generator 32 and a VGA horizontal signal VGA-HS from the VGA display, and then generate a synchronous VGA clock signal VGA-CLK to the A/D converter 1. The synchronous VGA clock signal VGA-CLK serves as a sampling signal for the A/D converter 1.

The horizontal scaling up device 6 includes a second phase-locked loop 61 and a TV timing clock generator 62. The TV timing clock generator 62 can supply a TV horizontal reference signal TV-HS-REF to the second phase-locked loop 61. The second phase-locked loop 61 can receive the TV horizontal reference signal TV-HS-REF from the TV timing clock generator 62 and a TV horizontal signal TV-HS from the TV display, and then generate a synchronous TV clock signal TV-CLK to the D/A converter 7. The synchronous TV clock signal TV-CLK serves as a sampling signal for the D/A converter 7.

It is possible to perform scaling up control By adjusting the horizontal scaling up factor A of the VGA timing clock generator 32. Similarly, it is possible to perform scaling down control By adjusting the horizontal scaling down factor B of the TV timing clock generator 62.

Finally, the digital TV output data TV O/P DATA can be converted into an analog signal by the D/A converter 7. The digital TV signal may be further processed by a microprocessor or a decoder (not shown) to transfer the digital TV signal into a TV signal format suitable to be displayed on the TV.

The operation theory including scaling down and scaling up operation in vertical direction of the present invention will be further described below.

The present invention uses a scaling ratio factor M/N to determine the scaling up and scaling down ratio, where M>N. The unit of both the M and N is the number of horizontal scan lines of the video data.

In vertical scaling down operation, scaling ratio factor M/N is defined as that discarding M scan lines from N scan lines supplied from the VGA input data. That is, only (N-M) lines of VGA input data can be entered into the memory unit in vertical scaling down operation.

As shown in FIG. 3, the vertical scaling down device 2 is supplied with scaling factors M1 and N1 used to control the scaling up or scaling down ratio of the VGA input data.

In the following description, M/N=3/10 is taken as an example to explain the scaling down theory of the present invention, which means that 3 scan lines must be discarded from 10 scan lines. In this case, there are 10 scan lines in total, designed by reference numerals L0, L1, L2, . . . L9, with an auxiliary counting value K. The auxiliary counting value K is counted from an initial value M. Once the counting value K is larger than or equal to N, it represents the corresponding horizontal scan line must be discarded. That is, the discarded scan line is not permitted to enter into the memory unit. Next, the corresponding counting value K of the next scan line of the VGA display is K-N+M. The process above will be performed repeatedly.

Figure 4:
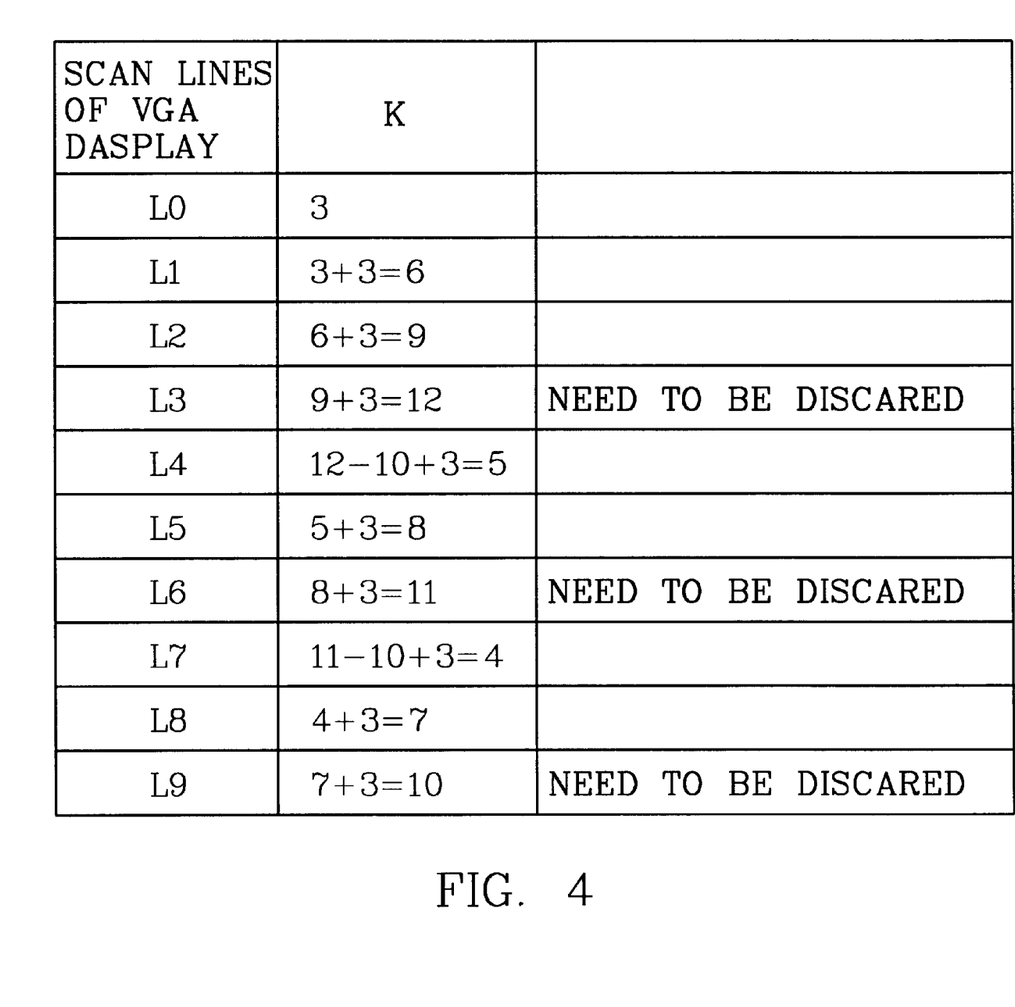
FIG. 4 is a table listing the relation between the numbered VGA scan lines of VGA signal and counting value K.

The relation between the counting values K and the scan lines from the VGA display is listed in FIG. 4. In the example of M/N=3/10, three counting values K corresponding to scan lines 3, 6, and 9 respectively must be discarded because they are larger than a preset value 10. On the contrary, the remained scan lines less than 10 are permitted to enter into the memory unit for displaying on a TV display.

Figure 5:
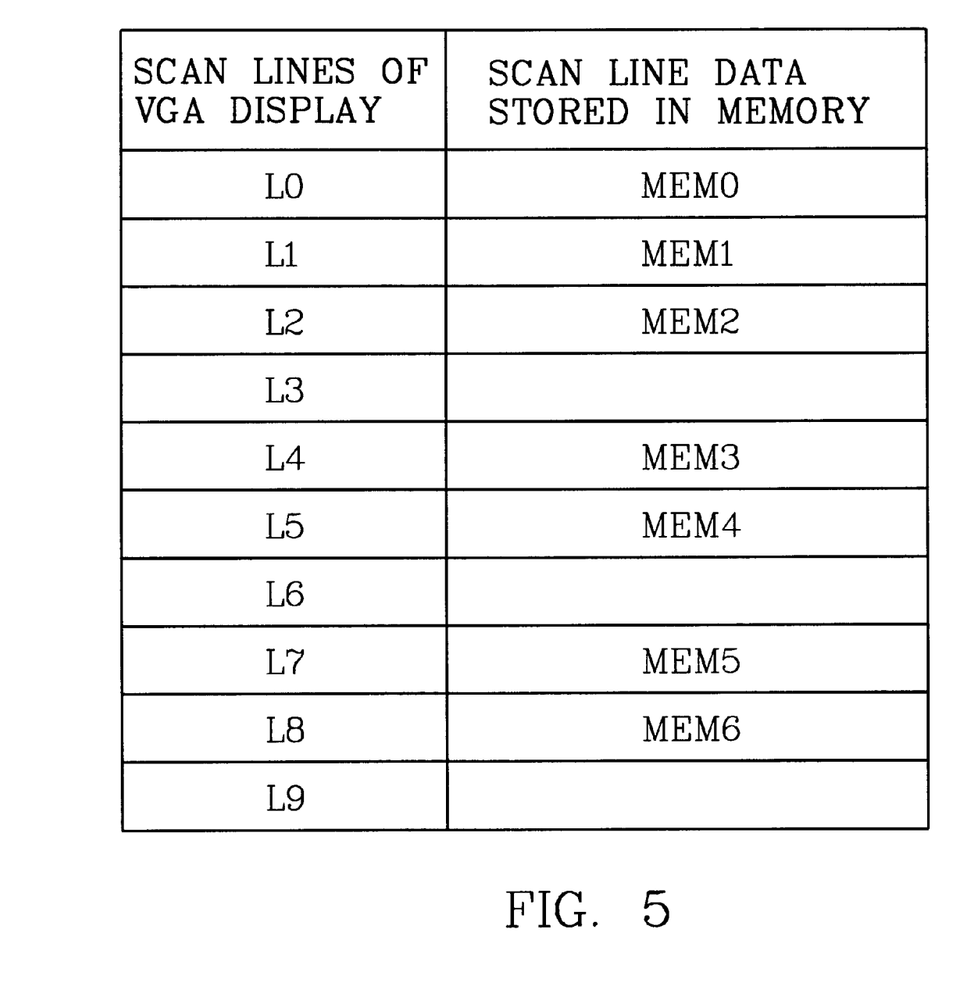
FIG. 5 is a table listing the relation between the numbered VGA scan lines of VGA signal and scan line data stored in memory unit.

FIG. 5 is a table showing the relation between the VGA input scan lines L0, L1, L2, L4, L5, L7, and L8 of the VGA display and the scan line data MEM0 to MEM6 stored in the memory unit of the present invention.

Similarly, in vertical scaling up operation of the present invention, scaling ratio factor M/N is defined as that adding M scan lines to N scan lines stored in the memory unit. That is, (N+M) scan lines will be displayed on the TV display.

As shown in FIG. 3, the vertical scaling up device 5 is supplied with scaling factors M2 and N2 used to control the scaling up or scaling down ratio of the scan line data stored in the memory unit. The theory of the vertical scaling up operation theory of the present invention is similar to that of the scaling down operation except that the operation of discarding specific VGA scan lines is replaced with an alternative operation of repeating specific scan lines data stored in the memory unit.

Figure 6:
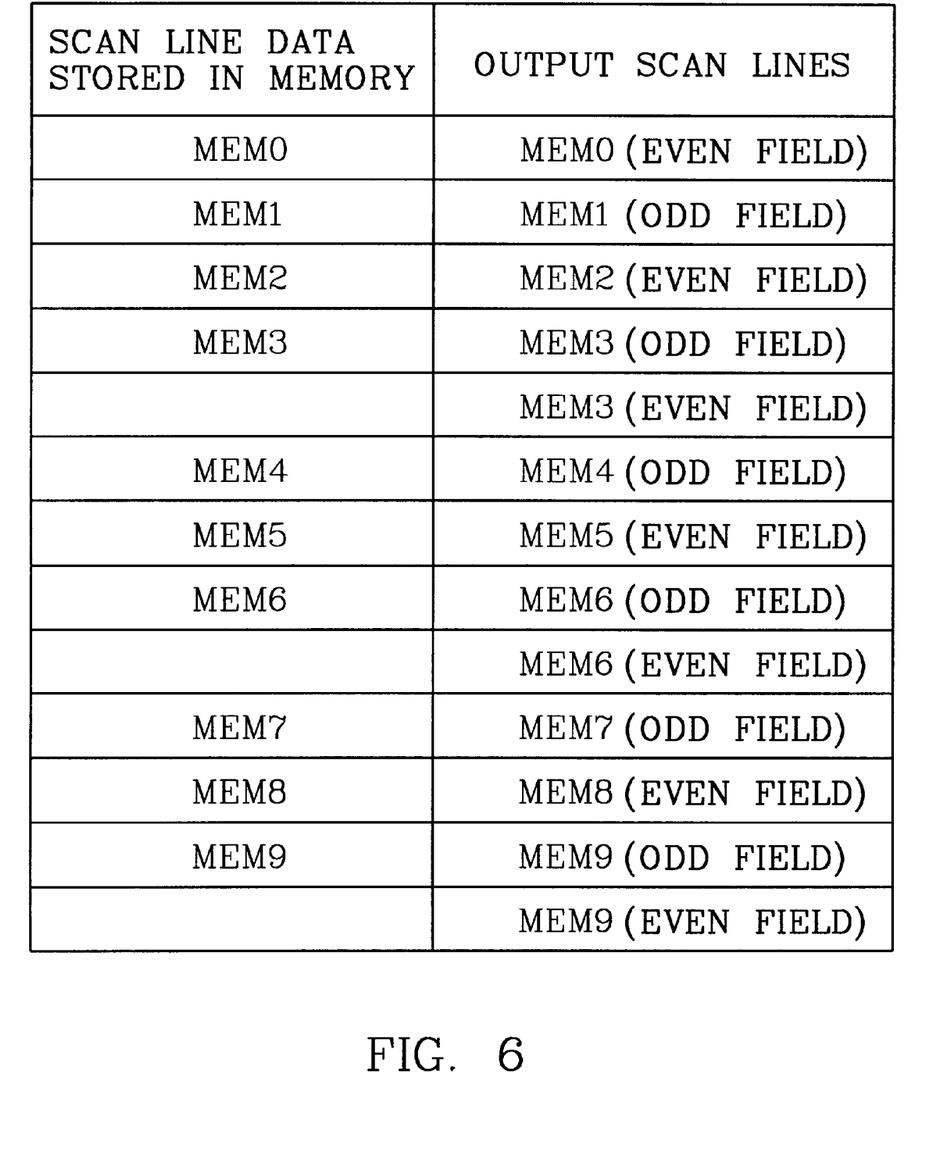
FIG. 6 is a table listing the relation between the scan line data stored in memory unit and the output scan lines.

FIG. 6 is a table showing the relation between the scan line data MEM0~MEM9 stored in the memory and the output scan lines to be displayed on TV display. In this case, in case that the scan line data MEM3, MEM6, and MEM9 is repeated, there will be 13 output scan lines. The resulting output scan lines will be outputted to D/A converter shown in FIG. 3, which will be displayed on TV display in interlaced displaying manner.

Figure 7:
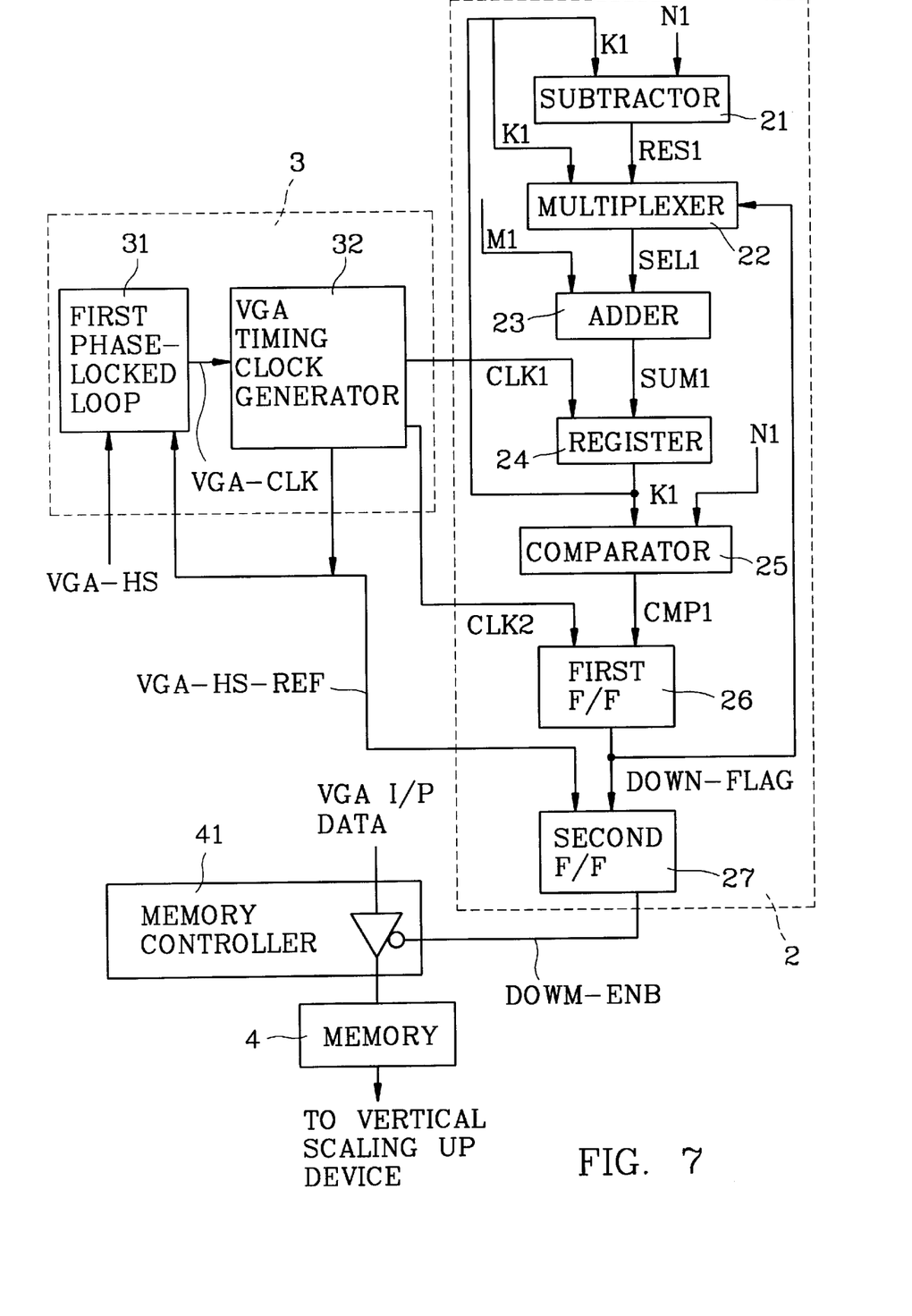
FIG. 7 is a circuit diagram of the scaling down device in accordance with a preferred embodiment of the present invention, which includes a vertical scaling down device and a horizontal scaling down device.

The preferred detail circuit diagram of the scaling down device of the present invention will be further described below. As shown in FIG. 7, there is shown the scaling down device including the vertical scaling down device 2 and the horizontal scaling down device 3 shown in FIG. 3. In this drawing, the same reference numbers used in the FIG. 3 will be used to refer to the same parts.

The vertical scaling down device 2 includes a subtractor 21, a multiplexer 22, an adder 23, a register 24, a comparator 25, a first flip-flop 26, and a second flip-flop 27. The horizontal scaling down device 3 includes a first phase-locked loop 31 and a VGA timing clock generator 32.

Under control of the vertical scaling down device 2 and the horizontal scaling down device 3, a scaling down enable signal DOWN-ENB is generated. The scaling down enable signal is used to control the operation of the memory controller 41 to determine whether the VGA input image data VGA I/P DATA from the VGA display is scaled down or entirely transmitted into the memory unit 4.

In the horizontal scaling down device 3, the VGA timing clock generator 32 is capable of supplying a VGA horizontal reference signal VGA-HS-REF to the first phase-locked loop 31. The first phase-locked loop 31 is arranged to receive the VGA horizontal reference signal VGA-HS-REF and the VGA horizontal signal VGA-HS from the VGA display, and then to generate a synchronous VGA clock signal VGA-CLK at its output to the VGA timing clock generator 32.

Thereafter, the VGA timing clock generator 32 will generate two timing clock signals CLK1 and CLK2, according to the synchronous VGA clock signal VGA-CLK, to the register 24 and the first flip-flop 26 of the vertical scaling down device 2. The timing clock signals CLK1 and CLK2 serve as timing control signals for the scaling down operation of the present invention.

Figure 8:
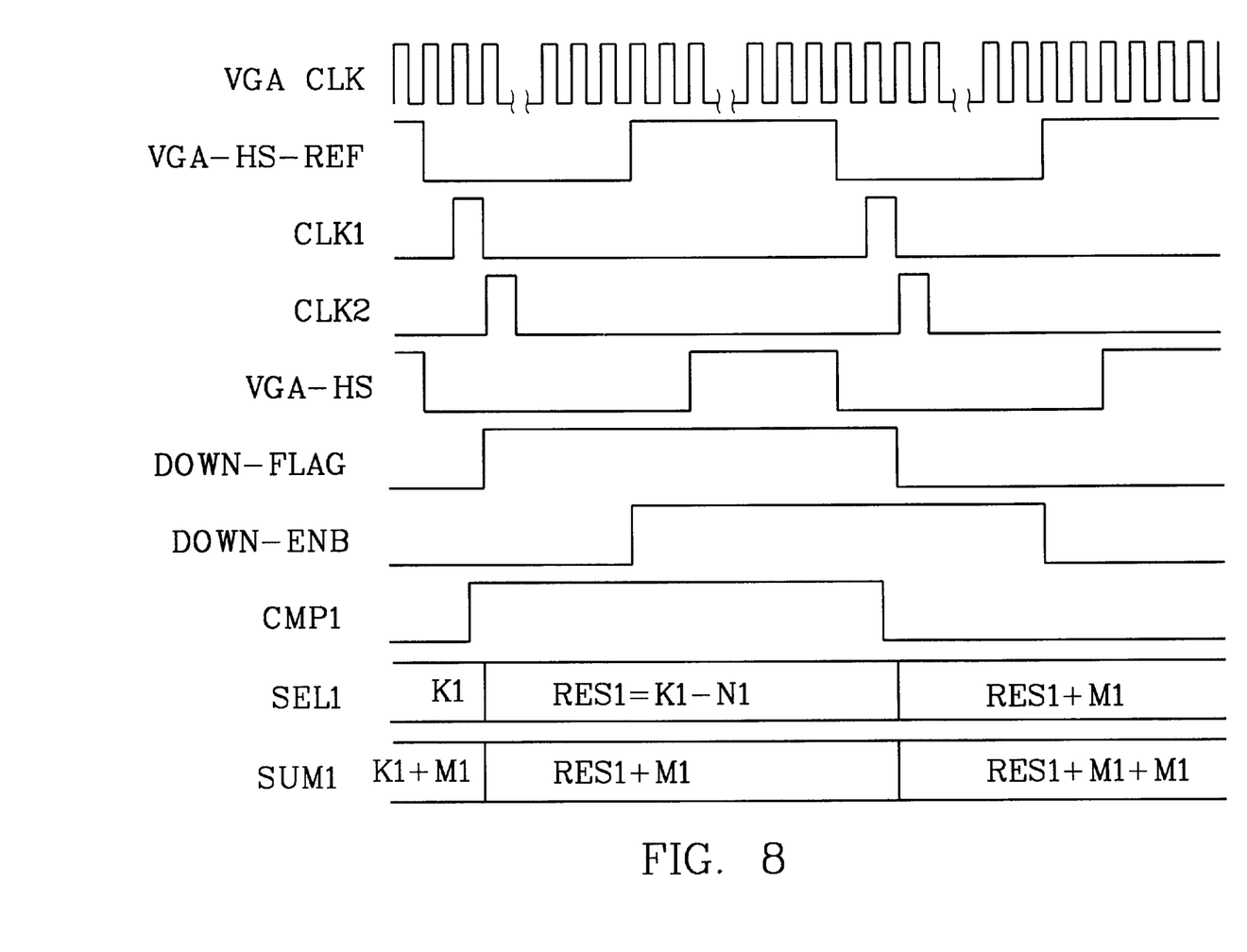
FIG. 8 is a timing diagram of the associated control signals of FIG. 7.

The timing diagram of the associated control signals of FIG. 7 is shown in FIG. 8. The working theory of the scaling down device of the present invention will be further described, with reference to FIGS. 7 and 8, as follows.

At first, the register 24, the first flip-flop 26, and the second flip-flop 27 are initially cleared. A scaling down flag designed by DOWN-FLAG is also cleared at the same time.

When the multiplexer 22 is switched to an input terminal to select a counting value K1, the counting value K1 is output at the output terminal SEL1 of the multiplexer 22. At this time, the output SUM of the adder 23 is equal to K1+M1. When the VGA-HS-REF is in low level period, The VGA timing generator 32 generates a first timing clock CLK1 to one input of the register 24, so as to latch the output of the adder 23 into the register 24. The latched value at output of the register 24 will be compared with a value N1 by the comparator 25.

A second timing clock CLK2 is generated by the VGA timing clock generator 32, following the first timing clock CLK1. The second clock CLK2 is sent to the first flip-flop 26, so as to latch the output signal at an output terminal CMP1 of the comparator 25 into the first flip-flop 26. The first flip-flop 26 is capable of generating a scaling down flag signal DOWN-FLAG to an input of the second flip-flop 27 and back to the multiplexer 22.

When the ending of the VGA-HS-REF, i.e. changing from low level to high level, the scaling down flag signal DOWN-FLAG is latched into the second flip-flop 27 at the rising edge of the signal VGA-HS-REF. The scaling down enable signal DOWN-ENB generated by the second flip-flop 27 serves as an enabling signal for the memory controller 41 to determine whether the VGA input data VGA I/P DATA is sent to the memory unit 4 or not. In this example, the VGA input data can be saved in the memory unit when the scaling down enable signal DOWN-ENB is in low level. On the contrary, the VGA input data can not be entered into the memory unit when the DOWN-ENB is in high level.

It is noted that the timing clock signals CLK1 and CLK2 are presented within the low level period of the signal VGA-HS-REF which is synchronous to the VGA-HS, so that the scaling down device of the present invention is actuated when each horizontal scan line of the VGA data is presented. When the counting value K1 is larger than the factor N1, the scaling down flag signal DOWN-FLAG is in high state. At this time, the multiplexer 22 is switched to select the output signal RES1 of the subtractor 21, in which the RES1 represents the residue value of K1-N1.

Figure 9:
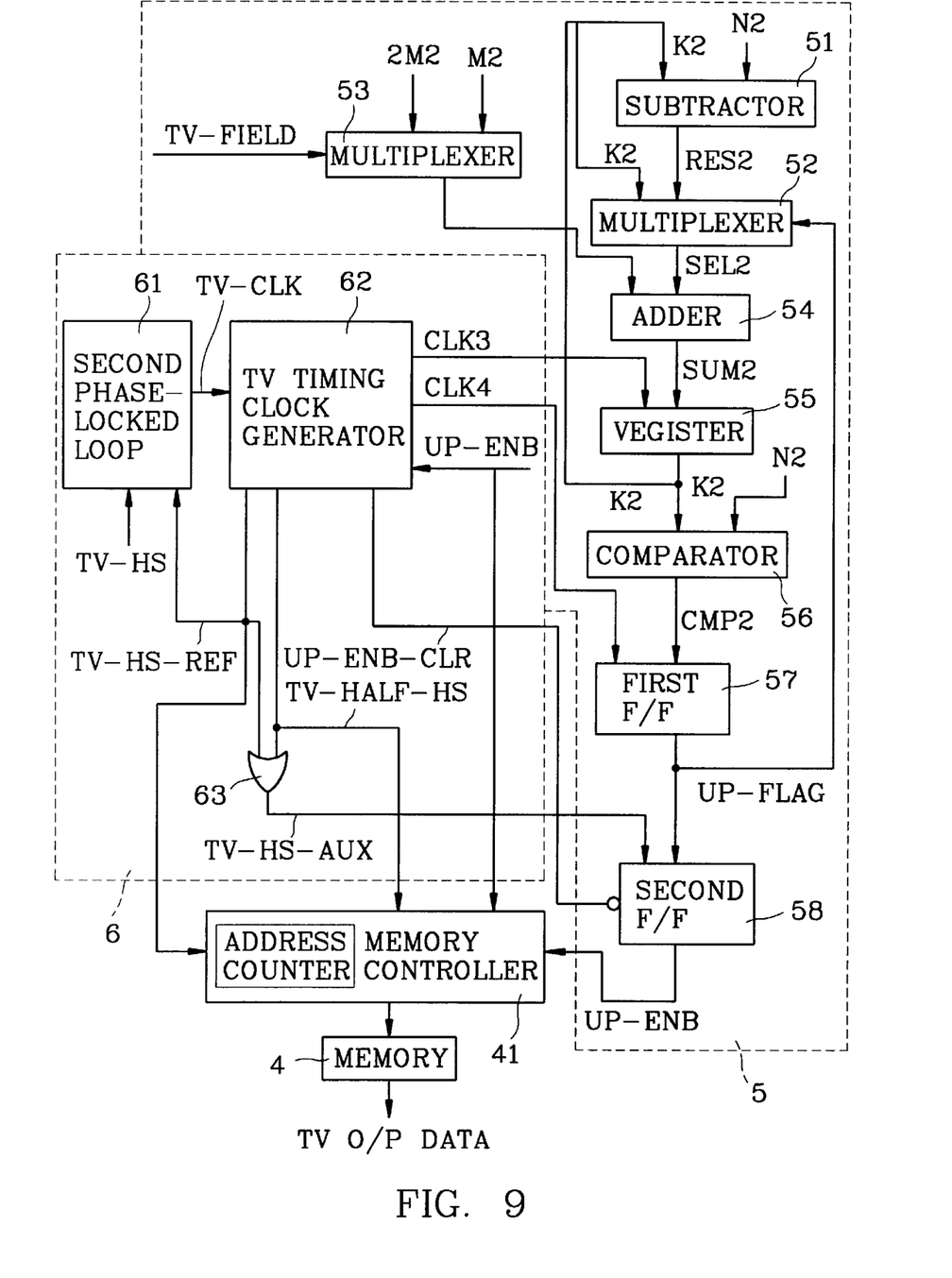
FIG. 9 is a circuit diagram of the scaling up device in accordance with a preferred embodiment of the present invention, which includes a vertical scaling up device and a horizontal scaling up device.

The preferred detail circuit diagram of the scaling up device of the present invention will be described below. As shown in FIG. 9, the scaling up device is composed of the vertical scaling up device 5 and the horizontal scaling up device 6 as shown in FIG. 3. In this drawing, the same reference numbers used in the FIG. 3 will be used to refer to the same parts. The major parts of the scaling up device shown in FIG. 9 are the same to that of the scaling down device as shown in FIG. 7.

The vertical scaling up device 5 includes a subtractor 51, a first multiplexer 52, a second multiplexer 53, an adder 54, a register 55, a comparator 56, a first flip-flop 57, and a second flip-flop 58. The horizontal scaling up device 6 includes a second phase-locked loop 61, a TV timing clock generator 62, and an OR gate 63.

Under control of the vertical scaling up device 5 and the horizontal scaling up device 6, a scaling up enable signal UP-ENB is generated. The scaling up enable signal is used to control the operation of the memory controller 41 to determine whether the scan line data stored in the memory unit 4 shown in FIG. 3 is repeated or not when it is outputted to the D/A converter 7.

In the horizontal scaling up device 6, the TV timing clock generator 62 is capable of supplying a TV horizontal reference signal TV-HS-REF to the second phase-locked loop 61. The first phase-locked loop 61 is arranged to receive the TV horizontal reference signal TV-HS-REF and the TV scan line signals TV-HS of the TV display, and then generate a synchronous TV clock signal TV-CLK at an output to the TV timing clock generator 62. Thereafter, the TV timing clock generator 62 will generate two timing clock signals CLK3 and CLK4 to the register 55 and the first flip-flop 57 of the vertical scaling up device 5. The timing clock signals CLK3 and CLK4 serve as timing control signals for the scaling up operation of the present invention.

In addition, it is noted that the interlaced displays require two raster scans field to complete each picture. That is, the first scan draws the odd-numbered lines and the second scan draws the even-numbered lines. So, in addition to the first TV horizontal reference signal TV-HS-REF, the TV timing clock generator 62 of the present invention is capable of generating a second TV horizontal reference signal TV-HALF-HS as an auxiliary signal in order to meet the interlaced displaying operation of the TV display.

The OR gate 63 provided with two inputs is arranged to receive the first TV horizontal reference signal TV-HS-REF and the second TV horizontal reference signal TV-HALF-HS and then generate a control signal TV-HS-AUX to the second flip-flop 58 as a clock input pulse. The second flip-flop 58 will output a scaling up enable signal UP-ENB, according to a scaling up flag signal UP-FLAG generated by the first flip-flop 57 and the control signal TV-HS-AUX to control the memory controller 41 to determine whether the scan line data stored in the memory unit 4 is sent to the TV display.

The second multiplexer 53 is controlled by a TV image field control signal TV-FIELD sent from the TV display to select either parameter M2 or 2M2 to meet the requirement of interlaced display control of TV display.

Figure 10A:
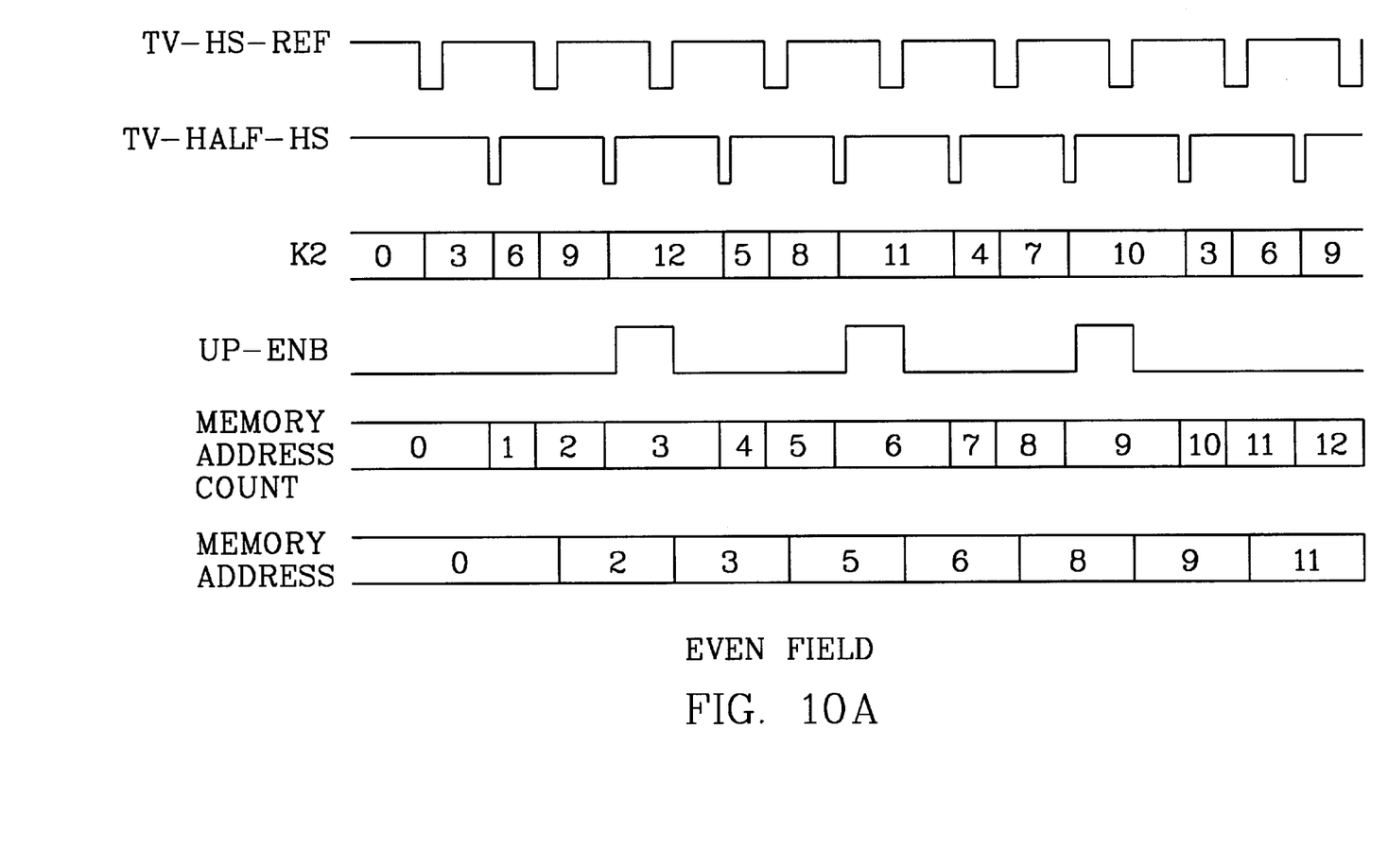
FIGS. 10A, 10B, and 10C are timing diagram of the associated control signals of FIG. 9.
Figure 10B:
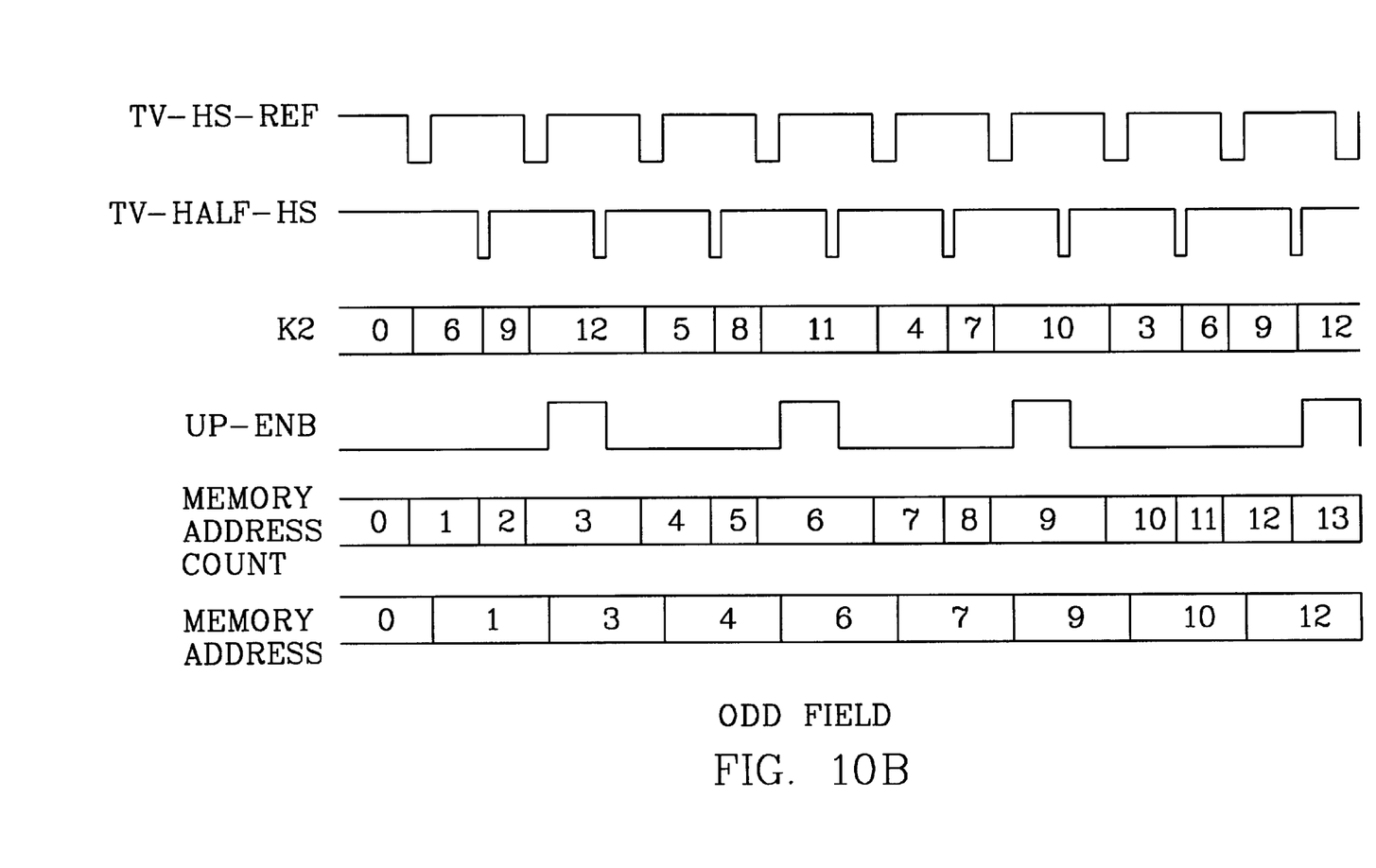
Figure 10C:
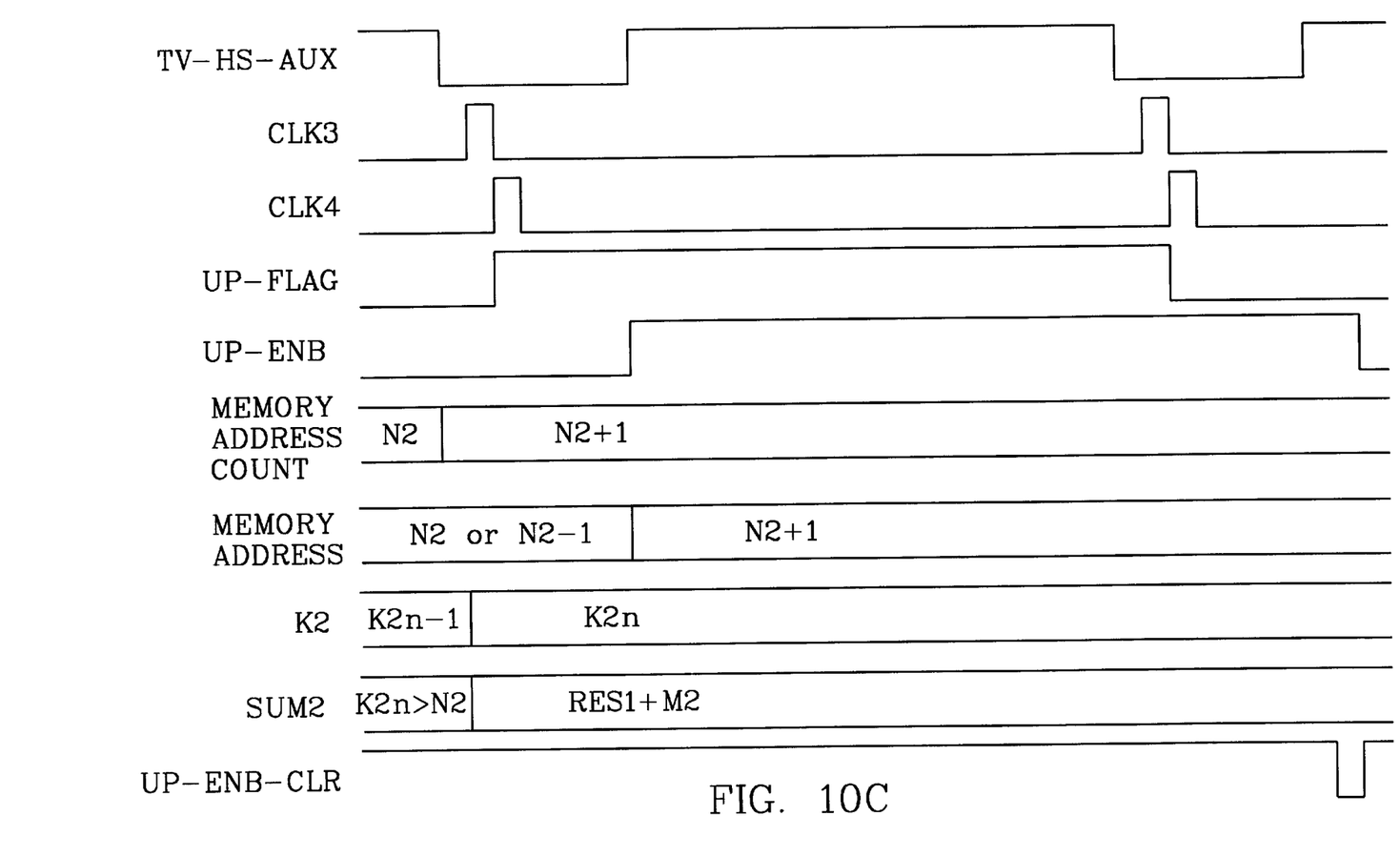

The timing diagram of the associated control signals of FIG. 9 is shown in FIGS. 10A, 10B, and 10C. FIG. 10A illustrates the timing diagram of associated control signals during odd field of the TV image. FIG. 10B illustrates the timing diagram of the associated control signals during even field of the TV image. FIG. 10C illustrates the timing diagram of associated signals under control of the timing clock signals CLK3 and CLK4.

At first, the register 55, the first flip-flop 57, and the second flip-flop 58 are initially cleared. The scaling up flag signal UP-FLAG is also cleared at the same time. When the multiplexer 52 is switched to an input terminal to select a counting value K2, the output SUM2 of the adder 54 is equal to M2 or 2M2, depended on the condition of the TV image field control signal TV-FIELD. The other timing control processes of the scaling up operation is similar to that of the scaling down operation.

In conclusion, from the detail description above, it is obvious that the converting and scaling device of the present invention is capable of effectively converting the non-interlace VGA signal to interlaced TV signal with any desired scaling size. Therefore, the present invention meets the requirements of patentability. While the arrangement and structure described above constitutes a preferred embodiment of this invention, it is to be understood that the present invention is not limited to this precise form and that changes may be made therein without departing from the scope and spirit of the invention as defined in the appended claim.

We claim:

1. An apparatus for converting non-interlaced VGA scan line signal of a VGA display to an interlaced TV signal and scaling the VGA signal to a desired TV output signal, the apparatus comprising:

analog to digital converting means for receiving and converting an analog RGB current signal of the VGA scan line signal of the VGA display into digital VGA input data;

vertical scaling down means for scaling down the digital VGA input data in a vertical direction to a VGA input signal from the analog to digital converting means by discarding a number of VGA input data corresponding to specific VGA display scan lines in accordance with a scaling down factor;

a memory unit for storing the reduced VGA input signal from the vertical scaling down means;

vertical scaling up means for scaling up the reduced VGA input signal stored in the memory unit in vertical direction to a TV output data by repeating specifically numbered VGA input signals in accordance with a scaling up factor;

digital to analog converting means for converting the TV output data from the vertical scaling up means to TV scan line signals to be displayed on the TV display;

horizontal scaling down means for scaling down the digital VGA input data in horizontal direction by generating VGA clock signals to the analog to digital converting means and adjusting the pulse width of the VGA clock signals to scale down the VGA input data in the horizontal direction; and horizontal scaling up means for scaling up the reduced VGA input signal stored in the memory unit in horizontal direction by generating TV clock signals to the digital to analog converting and scaling the pulse width of the TV clock signals to scale up the TV output data in horizontal direction.

2. The apparatus as claimed in claim 1, wherein the horizontal scaling down means comprises a phase-locked loop and a VGA timing clock generator, the VGA timing clock generator comprising means to generate a VGA horizontal reference signal to the phase-locked loop, the phase-locked loop being arranged to receive the VGA horizontal reference signal of the VGA timing clock generator and the VGA scan line signals from the VGA display and then generate a synchronous clock signal serving as a sampling signal for the analog to digital converting means.

3. The apparatus as claimed in claim 1, wherein the horizontal scaling up means comprises a phase-locked loop, an OR gate, and a TV timing clock generator, the TV timing clock generator comprising means to supply a first TV horizontal reference signal to the phase-locked loop, the phase-locked loop being arranged to receive the first TV horizontal reference signal of the TV timing clock generator and the TV scan line signals from the TV display and then generate a synchronous clock signal serving as a sampling signal for the digital to analog converting means, the TV timing clock generator further generating a second TV horizontal reference signal as an auxiliary signal, the OR gate being arranged to receive the first TV horizontal reference signal and the second TV horizontal reference signal and then generate a control signal to the vertical scaling up means in order to meet the interlaced display control of the TV display.

* * * * *